(12) United States Patent
Bringert et al.

(10) Patent No.: US 8,452,602 B1
(45) Date of Patent: May 28, 2013

(54) STRUCTURING VERBAL COMMANDS TO ALLOW CONCATENATION IN A VOICE INTERFACE IN A MOBILE DEVICE

(75) Inventors: Bjorn Erik Bringert, Bath (GB); Pawel Pietryka, London (GB); Peter John Hodgson, London (GB); Henrique Penha, San Francisco, CA (US); Simon Tickner, Whitstable (GB); Luca Zanolin, London (GB); Richard Zarek Cohen, London (GB); Michael J. LeBeau, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/621,018

(22) Filed: Sep. 15, 2012

Related U.S. Application Data

(60) Provisional application No. 61/541,992, filed on Sep. 30, 2011.

(51) Int. Cl.
*G10L 21/00* (2006.01)
*G10L 15/04* (2006.01)

(52) U.S. Cl.
USPC .......................... 704/275; 704/270; 704/251

(58) Field of Classification Search
USPC .................. 704/235, 251, 270, 275
See application file for complete search history.

(56) References Cited

U.S. PATENT DOCUMENTS

| | | | |
|---|---|---|---|
| 6,208,972 B1 * | 3/2001 | Grant et al. | 704/275 |
| 7,426,469 B1 * | 9/2008 | Grant et al. | 704/275 |
| 2006/0200348 A1 * | 9/2006 | Knott et al. | 704/246 |
| 2009/0327979 A1 * | 12/2009 | Haverinen et al. | 715/864 |
| 2011/0223893 A1 * | 9/2011 | Lau et al. | 455/414.1 |

* cited by examiner

*Primary Examiner* — Angela A Armstrong
(74) *Attorney, Agent, or Firm* — McDonnell Boehnen Hulbert & Berghoff LLP

(57) ABSTRACT

A spoken utterance includes at least a first level of a multi-level command format, in which the first level identifies an application. The spoken utterance may also include a second level of the multi-level command format, in which the second level identifies an action. In response to receiving the spoken utterance at a computing device, a representation of the application identified by the first level is displayed on a display of the computing device. If the spoken utterance includes the second level of the multi-level command format, the action identified by the second level is initiated. If the spoken utterance does not include the second level of the multi-level command format, the computing device waits for a predetermined period of time and provides at least one of an audible or visual action prompt if the second level is not received within the predetermined period of time.

20 Claims, 5 Drawing Sheets

STRUCTURING VERBAL COMMANDS TO ALLOW CONCATENATION IN A VOICE INTERFACE IN A MOBILE DEVICE

CROSS-REFERENCE TO RELATED APPLICATIONS

This patent application claims priority to U.S. Provisional Application No. 61/541,992, filed on Sep. 30, 2011, the contents of which are entirely incorporated herein by reference, as if fully set forth in this application.

BACKGROUND

A user interface allows a user to interact with a computing device. In one example, the computing device includes a display that provides a text-based user interface and/or graphical user interface. In various examples, a user can interact with the interface using an input device, such as a mouse or touchpad controlled cursor, a keypad, a track ball, and the like. In another example, the user can interact with the user interface with audible commands.

SUMMARY

In one aspect, a method is provided. A spoken utterance is received at a computing device. The spoken utterance includes at least a first level of a multi-level command format. The first level relates to an application. Speech recognition is performed on the spoken utterance to obtain text corresponding to the spoken utterance. Based on the text, the application is identified. A representation of the identified application is displayed on a display of the computing device. The method further involves determining whether the text includes a second level of the multi-level command format. The second level relates to an action. If the text includes the second level of the multi-level command format, the action is identified and the identified action is initiated. If the text does not include the second level of the multi-level command format, the computing device waits for a first predetermined period of time to receive an additional spoken utterance that includes the second level of the multi-level command format. If no spoken utterance that includes the second level is received within the first predetermined period of time, at least one of an audible or visual action prompt is provided.

In another aspect, a computer readable medium is provided. The computer readable medium has stored thereon instructions that, when executed by a computing device having at least one processor, cause the computing device to perform functions. The functions include: receiving a spoken utterance that includes at least a first level of a multi-level command format, in which the first level identifies an application; in response to receiving the spoken utterance, displaying a representation of the identified application on a display of the computing device; if the spoken utterance includes a second level of the multi-level command format, in which the second level identifies an action, initiating the identified action; and if the spoken utterance does not include the second level of the multi-level command format, waiting for a first predetermined period of time to receive an additional spoken utterance that includes the second level of the multi-level command format and, if no spoke utterance that includes the second level is received within the first predetermined period of time, providing at least one of an audible or visual action prompt.

In yet another aspect, a computing device is provided. The computing device includes at least one processor, data storage, and a plurality of instructions stored in the data storage. The plurality of instructions are executable by the at least one processor to cause the computing device to perform functions. The functions include: receiving a spoken utterance that includes at least a first level of a multi-level command format, in which the first level identifies an application; in response to receiving the spoken utterance, displaying a representation of the identified application on a display of the computing device; if the spoken utterance includes a second level of the multi-level command format, in which the second level identifies an action, initiating the identified action; and if the spoken utterance does not include the second level of the multi-level command format, waiting for a first predetermined period of time to receive an additional spoken utterance that includes the second level of the multi-level command format and, if no utterance that includes the second level is received within the first predetermined period of time, providing at least one of an audible or visual action prompt.

DETAILED DESCRIPTION

The present disclosure is directed generally to user interfaces that process audible inputs to control user interactions with computing devices and, more particularly, to such user interfaces that provide visual cues for audible inputs to control user interactions with computing devices. Generally, a powerful voice input or command language can be difficult to learn and to provide visual cues therefor. On the other hand, a very simple command language for which a device can provide visual and audible cues can be very slow to use for an expert user. The present disclosure provides a user interface that is adaptable for both beginner and expert users.

Figure 1:
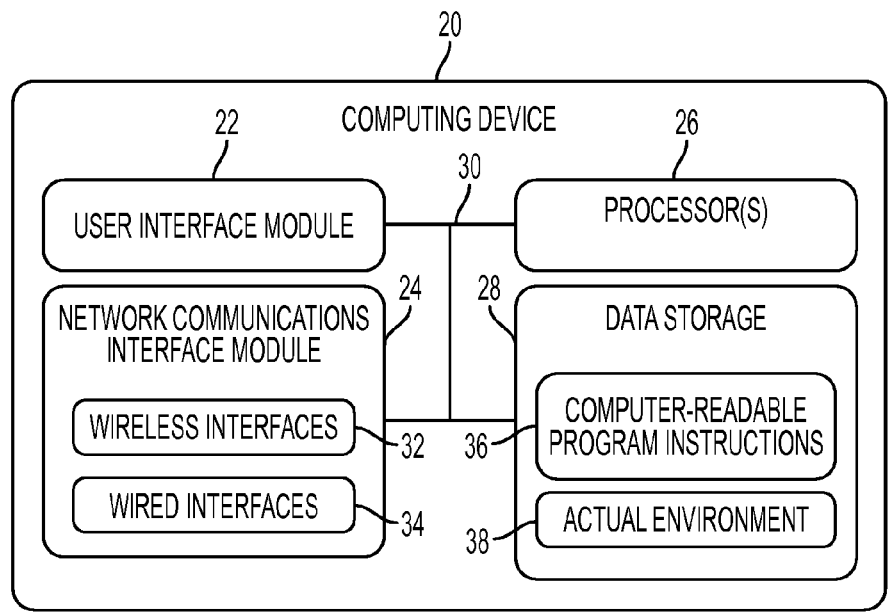
FIG. 1 is a block diagram of a computing device in accordance with an example embodiment.

FIG. 1 is a block diagram of a computing device 20 in accordance with an example embodiment. Generally, the computing device 20 can be any known computing device that can be configured to processes audible inputs to control user interactions therewith. In various examples, the computing device 20 can be a mobile device, such as a smart phone, a personal digital assistance, a global positioning service device, a tablet computer, a laptop, etc. The computing device 20 illustrated in FIG. 1 include a user interface module 22, a network-communication interface module 24, one or more processors 26, and data storage 28, all of which may be linked together via a system bus, network, or other connection mechanism 30.

The user interface module 22 can be operable to send data to and/or receive data from external user input/output devices. For example, the user interface module 22 can be configured to send and/or receive data to and/or from user input devices such as a keyboard, a keypad, a touch screen, a computer mouse, a track ball, a joystick, a camera, a voice recognition module, and/or other similar devices. The user interface module 22 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user interface module 22 can also include a microphone to receive audible input, such as spoken utterances, and can be configured to generate audible outputs to a speaker, speaker jack, audio output port, audio output device, earphones, and/or other similar devices. In particular, the computing device 20 with the user interface module 22 can be used to display a user interface.

The network-communications interface module 24 can include one or more wireless interfaces 32 and/or one or more wired interfaces 34 that are configurable to communicate via a communication network to other devices coupled to the network. For example, computing device 20 may communicate with a server that is configured to perform speech recognition on spoken utterances received by computing device 20. The wireless interfaces 32 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. The wired interfaces 34 can include one or more wired transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wired network.

The processors 26 can include one or more general purpose processors and/or one or more special purpose processors, for example, digital signal processors, application specific integrated circuits, and the like. The processors 26 can be configured to execute computer-readable program instructions 36 that are contained in the data storage 28 and/or other instructions as described herein.

The data storage 28 can include one or more computer-readable storage media that can be read and/or accessed by at least one of the processors 26. The one or more computer-readable storage media can include volatile and/or non-volatile storage components, such as optical, magnetic, organic or other memory or disc storage, which can be integrated in whole or in part with at least one of the processors 26. In some embodiments, the data storage 28 can be implemented using a single physical device, such as one optical, magnetic, organic or other memory or disc storage unit, while in other embodiments, the data storage can be implemented using two or more physical devices.

The data storage 28 can include the computer-readable program instructions 36, actual environment data 38, and perhaps additional data. The actual environment data 38 can include at least some of the data used by one or more processes and/or threads of a software application. In some embodiments, the data storage 28 can additionally include storage required to perform at least part of the herein-described methods and techniques.

Figure 2:
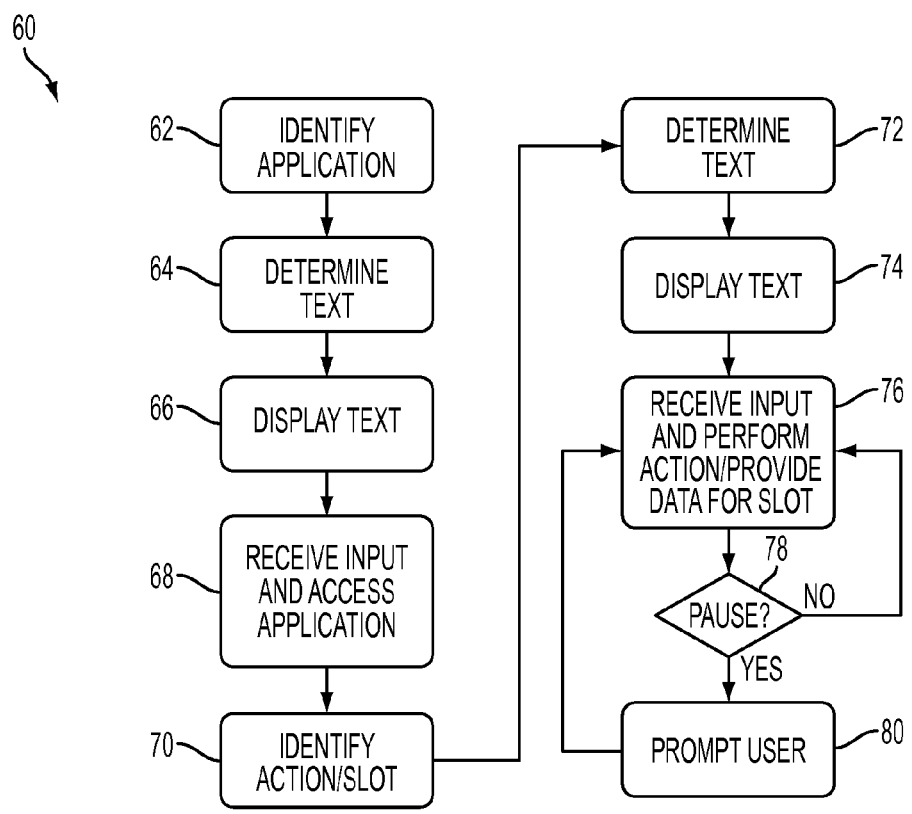
FIG. 2 is a flowchart of processes for providing a voice user interface in accordance with an example embodiment.

Referring now to FIG. 2, a flowchart 60 is illustrated that includes processes for providing a voice user interface in accordance with an example embodiment. The processes of FIG. 2 may be performed by utilizing various hardware and/or software components of the computing device 20 of FIG. 1. More particularly, in the present example, a user can speak an audible command to perform a task. Such audible commands can be structured into multi-level trees. For example, the command may include an Application level, an Action level, and a Slot level. Such a command may include an email Application level, a new message Action level, and one or more Slot levels for information associated with a recipient, a subject line, a message, etc. In another example, the command may include an Application level and a Slot level. Such a command may include a calculator Application level and one or more Slot levels for numbers and mathematical operators. Generally, the command may include as many or few levels as necessary or desired.

In FIG. 2, the flowchart 60 begins at a block 62 to identify an application or a plurality of applications that can be executed on a computing device. In the present example, the block 62 identifies an application that can be accessed by a user with an Application level audible input, such as a voice command received by a microphone of the computing device. In other examples, the block 62 identifies a plurality of applications that can each be accessed by a user with one or more of a plurality of different Application level audible inputs.

After the block 62, control passes to a block 64 to determine text of the Application level audible input that can be spoken by a user or otherwise audibly communicated to access the application. Such text is displayed by a block 66, for example, on a display of the computing device. Generally, a displayed text word or string represents each of the one or more applications identified by the block 62. The block 66 can display a plurality of text words or strings that each can represent one of a plurality of applications. The displayed text words or strings are displayed on the computing device to provide a visual cue of Application level audible inputs or commands to access such applications. The display of the computing device can include a plurality of applications, of which, some may not be accessible by an audible input. Further, such list of applications may be displayed in any suitable format, for example, in a scrollable list, a 3-D display, a spiral list, etc.

Next, control passes to a block 68 to scan the computing device for inputs. In one example, such inputs include an Application level audible input or a manual selection to access an application. In the present example, a user can access the application by speaking the displayed text of the Application level audible input or by manually selecting the application, such as by pressing on a touchpad that overlays the displayed text. If the block 68 receives any of the Application level audible input or manual selection, then the block 68 accesses the application. Thereafter, the display of the computing device can be automatically updated with a user interface for the application.

In the flowchart 60, a block 70 identifies an action and/or a slot associated with the application. Further, in the present example, the block 70 identifies one or more actions and/or slots that can be performed or accessed by an Action/Slot level audible input. Generally, an action can be a sub-application or command within the application and a slot can be an information box or cell. By way of non-limiting example, an application can be an email application, an action can be to send a new email, and a slot can include the recipient of the email. A single application may include one or more actions and one or more slots for each action. An application may also only include one or more slots, for example, an application can be a calculator application and the slots can include numbers and mathematical operators.

Once an application and/or slot is identified by the block 70, a block 72 determines text of the Action/Slot level audible input for performing or accessing such application and/or slot. Similarly to the block 66, a block 74 displays such text on the display of the computing device. In one example, text of Action/Slot level audible commands for a plurality actions and/or slots is displayed automatically upon the block 68 receiving the audible input to access an application. Alternatively, the text of Action/Slot level audible commands for a plurality of actions and/or slots can be displayed after an active user command to process the input of the block 68. Such active user command may include pressing a button to process speech, for example.

Next, control passes to a block 76 to scan the computing device for inputs. In one example, such inputs include an Action/Slot level audible input or a manual selection to perform an action and/or to access and input information into a slot. In the present example, a user can perform the action or access the slot by speaking the displayed text of the Action/Slot level audible input or by manually selecting the action or slot, such as by pressing on a touchpad that overlays the displayed text. If the block 76 receives any of the Action/Slot level audible input or manual selection, then the block 76 performs the requested interaction, for example, initiate a new email message or enter a mathematical formula. Thereafter, the display of the computing device can be automatically updated in accordance with the requested interaction.

The processes of the block 76 can be repeated for any number of actions/slots, for example, to allow a user to continue issuing audible commands to prepare and send an email to a recipient. In one example, the inputs received by the block 76 can cause the display of the computing device to be automatically updated in response to each audible and/or manual input.

The method 60 also includes a decision block 78, which identifies whether there is a pause for a predetermined time before an input is received. In one example, the block 78 determines if there is about a 0.5-1.5 second pause after an Action level audible input. If there is no pause, then control passes back to the processing of the block 76, as described above. If there is a pause, then control passes to a block 80 to prompt the user to provide an input. The prompt can be a visual cue, such as highlighting an action or a slot, or an audible cue, such as a beep or an audible command to select an action or input information into a slot. After the user is prompted by the block 80, control can pass back to the processing of the block 76.

In one example, the blocks 78-80 can be performed only were the command is at the slot level. For example, the user has voiced commands to access an Email application and to perform a new message task but then pauses. At this point, the block 80 can prompt the user to enter information for a recipient slot, a subject line slot, and/or a message slot.

Generally, the flowchart 60 of FIG. 2 is configured for use by beginner and expert users. For example, an expert user can simply issue a continuous command that includes Application level, Action level, and/or Slot level audible inputs and the computing device will perform the desired command. Alternatively, a beginner user can issue separate commands for one or more of the Application, Action, and/or Slot levels and can be provided a prompt to assist, if needed.

Although the blocks 62-80 are illustrated in a sequential order, the blocks may also be performed in parallel and/or in a different order than described herein. Also, method 60 may include additional or fewer blocks, as needed or desired. For example, the various blocks 62-76 may be combined into fewer blocks, divided into additional blocks, and/or removed based upon a desired implementation.

In addition, each block 62-80 may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, one or more of the blocks 62-80 may represent circuitry that is wired to perform the specific logical functions of the method 60.

Figure 3A:
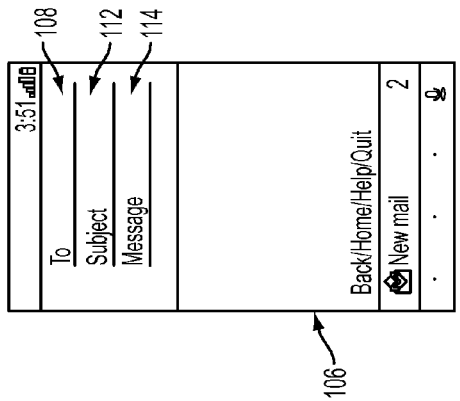
FIGS. 3A-3F are screenshots of a voice user interface in accordance with an example embodiment.

Referring to FIGS. 3A-3H, various screens shots are illustrated that include a user interface 100 in accordance with an example embodiment. With further reference to the flowchart 60 of FIG. 2, in FIG. 3A, the user interface 100 includes a list 102 of various applications, which may have been identified during the block 62 of FIG. 2. In the present non-limiting example, the applications include Calculator, Calendar, Camera, Messages, Compass, Email, Clock, Google+, Evernote, and Phone applications. One or more of these applications can be accessible by an audible input. In one example, all of the displayed applications are accessible by Application level audible inputs. More particularly, the block 64 of FIG. 2 determines text of Application level audible inputs that can be communicated to access the applications and the block 66 displays the text in the list 102. In FIG. 3A, the text may correspond to a name of the application, although, in other examples, the text may include additional, fewer, and/or different text from the name of the application.

Figure 3B:
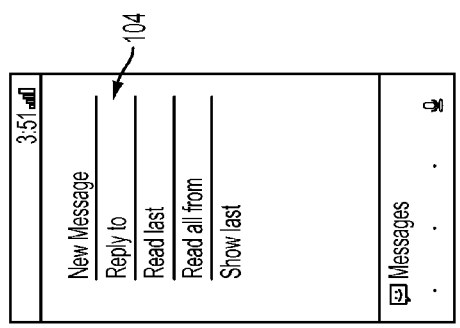

In FIG. 3B, a user has spoken the Application level audible input for the Email application, for example, which has been received by the block 68. Subsequently, the blocks 70-74 have identified a plurality of actions, such as send or compose a new message, reply to a received message, read a most recent message, read all messages from a particular sender, show list of most recent messages (block 70), determined text of audible inputs for performing such actions, for example, New Message, Reply to, Read last, Read all from, and Show last (block 72), and displayed such text of audible inputs 104 (block 74). As discussed above, the text of Action level audible inputs 104 in FIG. 3B can be displayed automatically in response to receiving an Application level audible or manual user input to access the Email application. Further, in the present example, the displayed text 104 includes the actual text string that can be spoken to access each action.

Figure 3C:
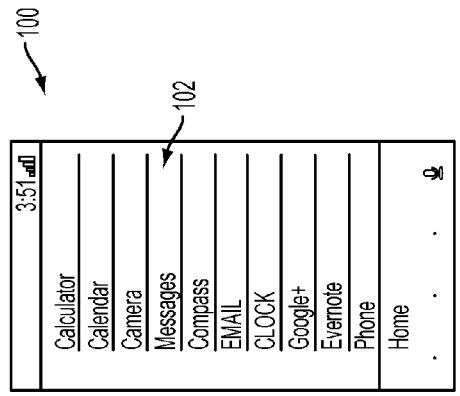

Next, in FIG. 3C, the user has selected the new message action by speaking the audible input "New Message" or by manually selecting the New Message option from the user interface 100 of FIG. 3B. Consequently, the new message action is accessed and a new message user interface 106 is displayed, in accordance with the block 76 of FIG. 2, for example.

Figure 3D:
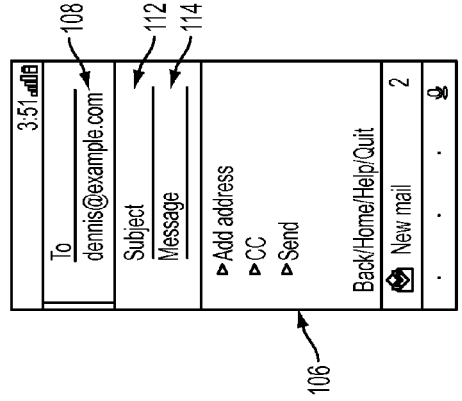

Thereafter, the user pauses for a predetermined time, for example, 1 second, and the decision block 78 identifies the pause. Next, control passes to the block 80 to prompt the user to enter an input in a To slot 108 of the new message user interface 106, for example, by highlighting the To slot 108 as shown in FIG. 3D. In general, the prompt could involve a visual cue, such as highlighting the To slot 108, and/or an audible cue to enter information in the To slot.

Figure 3E:
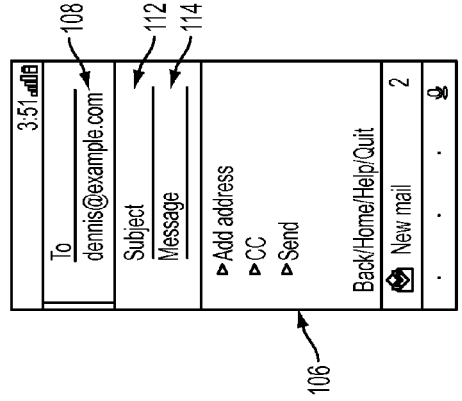
Figure 3F:
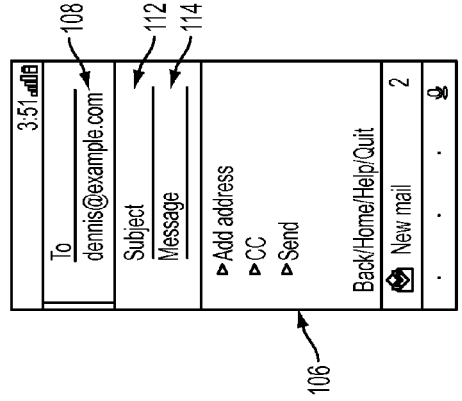

Thereafter, the user has provided an input to select the To slot 108 and, in response, the user interface 100 has been updated to display a list of contacts 110, which is shown in FIG. 3E, for example. The user can speak the name of an intended recipient or otherwise select the intended recipient. In the present example, the user has selected Dennis, which populates the To slot 108 in the new message user interface 106 with an email address for Dennis, which is shown in FIG. 3F as dennis@example.com.

In the present example, another pause is identified by the block 78 and the block 80 prompts the user to enter an input for another slot, such as a Subject slot 112 or a Message slot 114. In the example shown in FIG. 3G, the Message slot 114 is highlighted. In general, the prompt could involve a visual cue, such as highlighting Message slot 114 and/or an audible cue to provide another slot input. In response to the prompt, the user provides an input, such as an audible input, to provide the message for the slot 114, as shown in FIG. 3H.

Figure 3H:
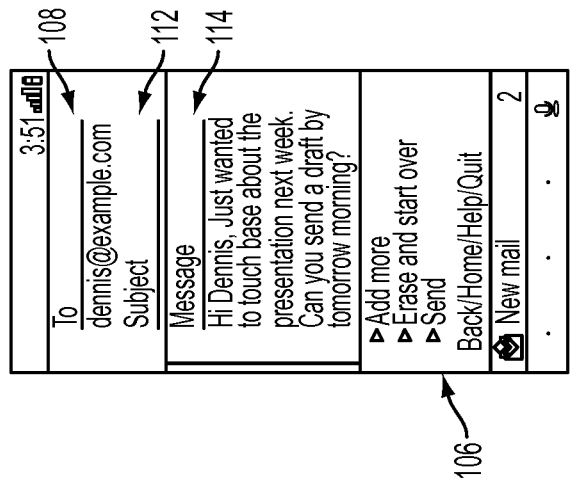
Figure 3G:
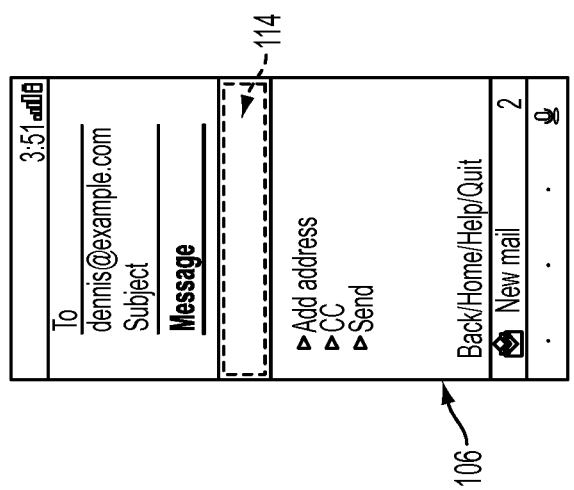

FIG. 3H further illustrates an example screenshot where the new message user interface 106 has been continuously and automatically updated in accordance with user inputs (for example, according to the block 76 of FIG. 3) and the identification of additional actions/slots (for example, according to the blocks 70-74 of FIG. 3). Consequently, in FIG. 3H, the user has provided inputs to the To slot 108 and the Message slot 114, and is allowed to perform other actions represented by the text of audible inputs to Add more, Erase and start over, and Send, for example.

Figure 4:
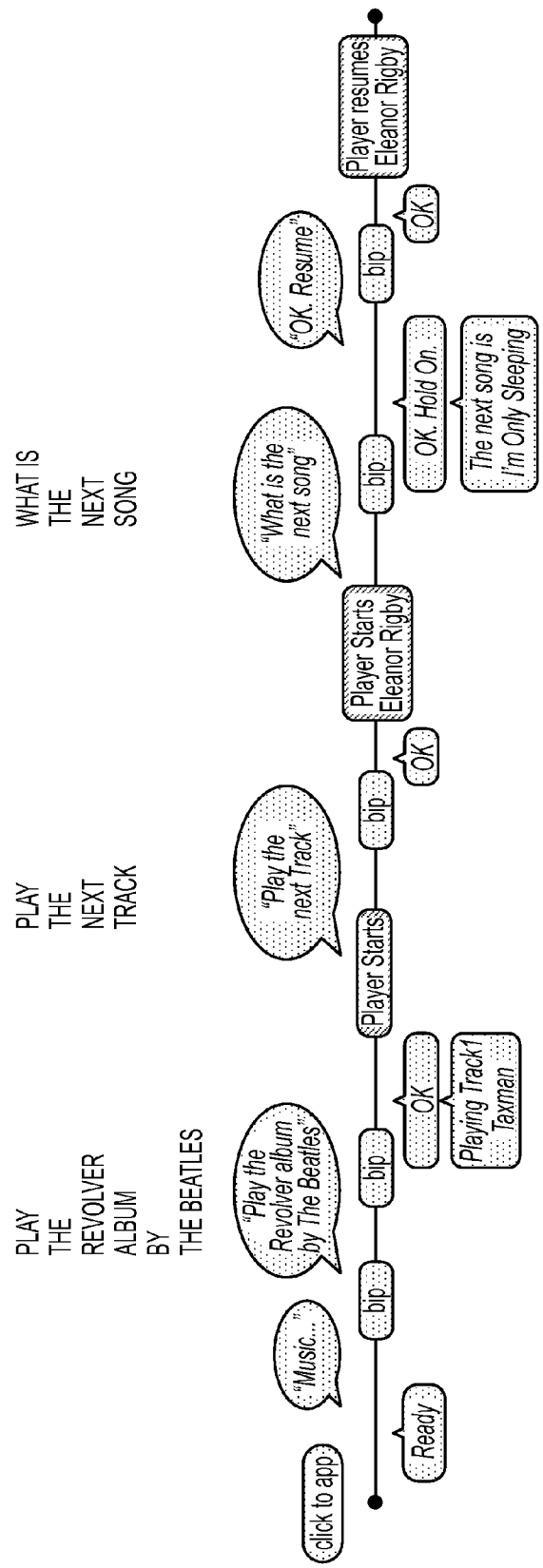
FIG. 4 a block diagram showing a structured audible command being provided in the context of a music player application.

FIG. 4 illustrates another example of a user providing a structured audible command in the context of a music player application. The structured audible command includes Application level, Action level, and Slot level inputs. Generally, various Action level and Slot level inputs can be provided and processed while the computing device is operating within a structured audible command. As shown, a spoken input "Music" is an Application level input that invokes a music application and a spoken input "Play the Revolver album by The Beatles" is an Action level input that causes a particular album to be played. Then, for example, if the music application is playing the first track of the album and the user wishes to select the next track, the user can provide an audible command as Slot level input to play the next track without providing audible commands to access the Application and Action levels. Other audible commands, such as "Pause" and "Resume" could be used to control the play of tracks within the same Action level. Audible commands could also be used to obtain information within the Action level, such as "What is the next song?" Other types of audible commands could be used within a given Action level as well.

As the foregoing examples illustrate, spoken input can be received in a multi-level command format. The first level of the multi-level command format can be an Application level that relates to an application. The second level of the multi-level command format can be an Action level that relates to an action. The third level of the multi-level command format can be a Slot level that relates to slot input. A spoken utterance might include all three levels. Alternatively, a spoken utterance might include only the first level, or only the first and second levels. In that case, the one or more remaining levels of the multi-level command format could be included in one or more additional spoken utterances. Thus, if a computing device receives a spoken utterance that includes only the first level, the computing device could wait for a period of time to receive an additional spoken utterance that includes the second level. If no spoken utterance that includes the second level of the multi-level command format is received within the period of time, the computing device could provide a prompt. Similarly, if the spoken utterance and/or additional spoken utterance do not include the third level of the multi-level command format, then the computing device could wait for a period of time to receive an additional spoken utterance that includes the third level and, if not received within that period of time, provide a prompt.

Figure 5:
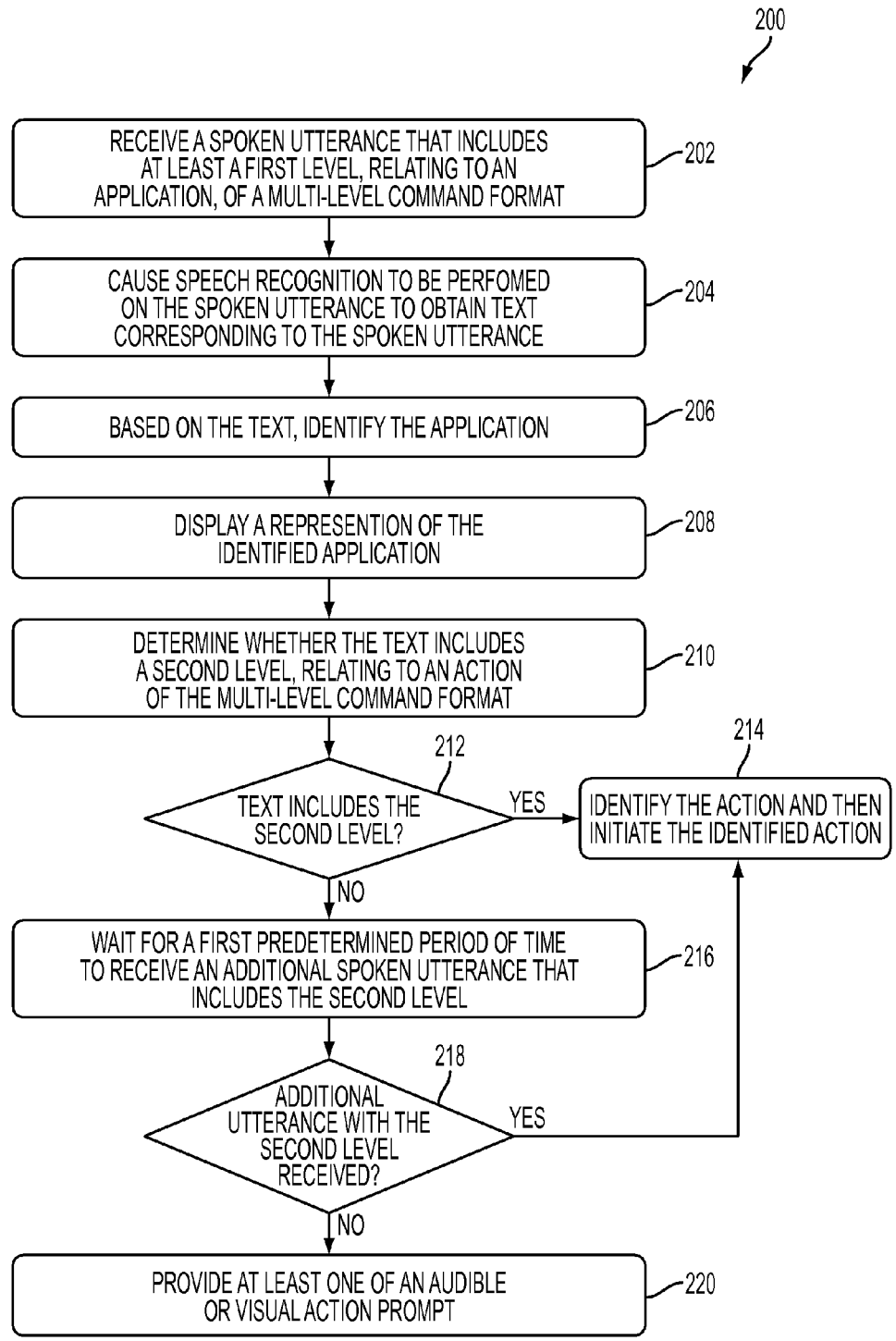
FIG. 5 is a flowchart of a method for analyzing spoken input with reference to a multi-level command format in accordance with an example embodiment.

FIG. 5 illustrates an example method 200 for analyzing spoken input with reference to a multi-level command format. Block 202 involves receiving a spoken utterance (e.g., via a microphone of computing device 20) that includes at least a first level of a multi-level command format. The first level relates to an application.

Block 204 involves causing speech recognition to be performed on the spoken utterance to obtain text corresponding to the spoken utterance. The speech recognition could be performed by the device that receives the spoken utterance (e.g., computing device 20), by a server in communication with the receiving device, or by a combination thereof. For example, a computing device could transmit the spoken utterance to a server, the server could perform speech recognition on the spoken utterance to obtain text, and the computing device could receive the text from the server.

Block 206 involves, based on the text, identifying the application. Identifying the application could involve use of predefined associations, in which each application is associated with one or more words or phrases that serve to identify the application. The application could then be identified by finding a word or phrase associated with that application in the text corresponding to the spoken utterance. For example, the word or phrase that identifies the application in the text could correspond to a word or phrase that is displayed on a display of a computing device as a visual cue, as discussed above for block 66 of FIG. 2.

Block 208 involves displaying a representation of the identified application. The representation of the identified application could be any display that is generated based on the identified application. For example, the representation could be a user interface that is displayed on a display of a computing device. The representation could also include textual and/or graphical indications of actions that are available for that application (e.g., as shown in FIG. 3B). Any of the indicated actions could be included in the spoken utterance or a subsequent spoken utterance as a second level of the multi-level command format.

Block 210 involves determining whether the text includes a second level of the multi-level command format. The second level relates to an action. This determination could be made based on whether the text includes any words or phrases that are valid in the second level of the multi-command format, given the identified application as the first level of the multi-level command format. The valid words or phrases could be, for example, indicated in the representation of the identified application that is displayed at block 208.

Block 212 indicates a decision point in which a decision is made based on whether the text includes the second level of the multi-level command format. If the text includes the second level of the multi-level command format, method 200 proceeds to block 214. If the text does not include the second level of the multi-level command format, method 200 proceeds to block 216.

Block 214 involves identifying the action and initiating the identified action. Identifying the action could involve use of predefined associations, in which each action is associated with a word or phrase. An action can then be identified by matching a word or phrase in the text that is valid for the second-level of the multi-level command format to a word or phrase that is associated with that action. Initiating the identified action could involve, for example, any activity by a computing device that causes the identified action to be performed on the computing device or on another device.

Block 216 involves waiting (e.g., by computing device 20) for a first predetermined period of time to receive an additional utterance that includes the second level of the multi-level command format. Block 218 indicates a decision point in which a decision is made based on whether an additional utterance that includes the second level is received within the first predetermined period of time. If an additional utterance that includes the second level is received within the first predetermined period of time, method 200 proceeds to block 214, as described above. If no additional utterance that includes the second level is received within the first predetermined period of time, then method 200 proceeds to block 220.

Block 220 involves providing (e.g., by computing device 20) at least one of an audible or visual action prompt. In response to this prompt, an additional spoken utterance that includes the second level could be received. In that case, method 200 could proceed to block 214, as described above.

With regard to block 214, in some examples, the identified action could be initiated without any additional input. In other examples, however, the identified action could be initiated after populating one or more slots of the identified action with slot input. Thus, method 200 could further involve determining whether text obtained by speech recognition (e.g., speech recognition performed on either the spoken utterance received at block 202 or on an additional spoken utterance that is received within the waiting period of block 216 or after the prompt of block 220) includes a third level of the multi-level command format. The third level relates to slot input. If the text includes the third level, then one or more slots of the action identified in block 214 could be populated with the slot input provided as the third level. The action could then be initiated with the one or more slots populated with the slot input.

On the other hand, if the text does not include the third level, then method 200 may involve waiting for a second predetermined period of time to receive an additional spoken utterance that includes the third level of the multi-level command format. If no spoken utterance that includes the third level is received within the second predetermined period of time, then an audible and/or visual prompt may be provided. In this way, an additional spoken utterance that includes the third level may be received within a waiting period or after a prompt. Slot input may be obtained from speech recognition that is performed on the additional spoken utterance and used to populate one or more slots of the identified action.

Method 200 thus enables a voice interface to accept multiple levels of a multi-level command format in a single spoken utterance (e.g., a spoken utterance that identifies an application, an action, and slot input for the action) and to accept multiple levels of the multi-level command format in separate spoken utterances (e.g., an application in a first utterance, an action in a second utterance, and slot input in a third utterance). Each level of the multi-level command format may be obtained by speech recognition that is performed on one or more spoken utterances. The speech recognition could be performed by the device that receives the spoken utterance (e.g., computing device 20) and/or by a separate device (e.g., a server in communication with computing device 20).

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving a spoken utterance at a computing device, wherein the spoken utterance includes at least a first level of a multi-level command format, wherein the first level relates to an application;
   causing speech recognition to be performed on the spoken utterance to obtain text corresponding to the spoken utterance;
   based on the text, identifying the application;
   displaying a representation of the identified application on a display of the computing device;
   determining whether the text includes a second level of the multi-level command format, wherein the second level relates to an action;
   if the text includes the second level of the multi-level command format, identifying the action;
   if the text does not include the second level of the multi-level command format, waiting by the computing device for a first predetermined period of time to receive an additional spoken utterance that includes the second level of the multi-level command format and, if no spoken utterance that includes the second level is received within the first predetermined period of time, providing at least one of an audible or visual action prompt;
   determining whether the text includes a third level of the multi-level command format, wherein the third level relates to slot input;
   if the text includes both the second level and the third level of the multi-level command format, populating at least one slot of the identified action with the slot input and initiating the identified action with the at least one slot populated with the slot input; and
   if the text includes the second level but not the third level of the multi-level command format, waiting for a second predetermined period of time to receive an additional spoken utterance that includes the third level of the multi-level command format and, if no additional spoken utterance that includes the third level is received within the second predetermined period of time, providing at least one of an audible or visual slot prompt.

2. The method of claim 1, wherein displaying a representation of the identified application comprises displaying indications of actions that are available for the identified application.

3. The method of claim 1, further comprising displaying a user interface based on the identified application on the display of the computing device.

4. The method of claim 3, wherein the user interface includes a plurality of slots.

5. The method of claim 4, wherein populating at least one slot of the identified action with the slot input comprises displaying text in at least one of the plurality of slots.

6. The method of claim 4, wherein the identified application is an email application.

7. The method of claim 6, wherein the plurality of slots include a recipient slot, a subject slot, and a message slot.

8. A non-transitory computer readable medium having stored thereon instructions that, when executed by a computing device having at least one processor, cause the computing device to perform functions comprising:
receiving a spoken utterance, wherein the spoken utterance includes at least a first level of a multi-level command format, wherein the first level identifies an application;
in response to receiving the spoken utterance, displaying a representation of the identified application on a display of the computing device;
determining whether the spoken utterance includes a second level of the multi-level command format, wherein the second level relates to an action;
if the spoken utterance includes the second level of the multi-level command format, identifying the action;
if the spoken utterance does not include the second level of the multi-level command format, waiting for a first predetermined period of time to receive an additional spoken utterance that includes the second level of the multi-level command format and, if no additional spoken utterance that includes the second level is received within the first predetermined period of time, providing at least one of an audible or visual action prompt;
determining whether the spoken utterance includes a third level of the multi-level command format, wherein the third level identifies slot input;
if the spoken utterance includes both the second level and the third level of the multi-level command format, populating at least one slot of the identified action with the slot input and initiating the identified action with the at least one slot populated with the slot input; and
if the spoken utterance includes the second level but not the third level of the multi-level command format, waiting for a second predetermined period of time to receive an additional spoken utterance that includes the third level of the multi-level command format and, if no additional spoken utterance that includes the third level is received within the second predetermined period of time, providing at least one of an audible or visual slot prompt.

9. The non-transitory computer readable medium of claim 8, wherein displaying a representation of the identified application comprises displaying indications of actions that are available for the identified application.

10. The non-transitory computer readable medium of claim 8, wherein the functions further comprise displaying a user interface based on the identified application on the display of the computing device.

11. The non-transitory computer readable medium of claim 10, wherein the user interface includes a plurality of slots.

12. The non-transitory computer readable medium of claim 11, wherein populating at least one slot of the identified action with the slot input comprises displaying text in at least one of the plurality of slots.

13. The non-transitory computer readable medium of claim 11, wherein the identified application is an email application.

14. A computing device, comprising:
at least one processor;
data storage;
a plurality of instructions stored in the data storage and executable by the at least one processor to cause the computing device to perform functions, the functions comprising:
receiving a spoken utterance, wherein the spoken utterance includes at least a first level of a multi-level command format, wherein the first level identifies an application;
in response to receiving the spoken utterance, displaying a representation of the identified application on a display of the computing device;
determining whether the spoken utterance includes a second level of the multi-level command format, wherein the second level relates to an action;
if the spoken utterance includes the second level of the multi-level command format, identifying the action;
if the spoken utterance does not include the second level of the multi-level command format, waiting for a first predetermined period of time to receive an additional spoken utterance that includes the second level of the multi-level command format and, if no additional spoken utterance that includes the second level is received within the first predetermined period of time, providing at least one of an audible or visual action prompt;
determining whether the spoken utterance includes a third level of the multi-level command format, wherein the third level identifies slot input;
if the spoken utterance includes both the second level and the third level of the multi-level command format, populating at least one slot of the identified action with the slot input and initiating the identified action with the at least one slot populated with the slot input; and
if the spoken utterance includes the second level but not the third level of the multi-level command format, waiting for a second predetermined period of time to receive an additional spoken utterance that includes the third level of the multi-level command format and, if no additional spoken utterance that includes the third level is received within the second predetermined period of time, providing at least one of an audible or visual slot prompt.

15. The computing device of claim 14, wherein displaying a representation of the identified application comprises displaying indications of actions that are available for the identified application on the display of the computing device.

16. The computing device of claim 14, wherein the functions further comprise displaying a user interface based on the identified application on the display of the computing device.

17. The computing device of claim 16, wherein the user interface includes a plurality of slots.

18. The computing device of claim 17, wherein populating at least one slot of the identified action with the slot input comprises displaying text in at least one of the plurality of slots.

19. The computing device of claim 17, wherein the identified application is an email application.

20. The computing device of claim 19, wherein the plurality of slots include a recipient slot, a subject slot, and a message slot.

* * * * *